June 3, 1924.
W. K. LEWIS ET AL
1,496,757
PROCESS OF SEPARATING GASES
Filed July 26, 1920
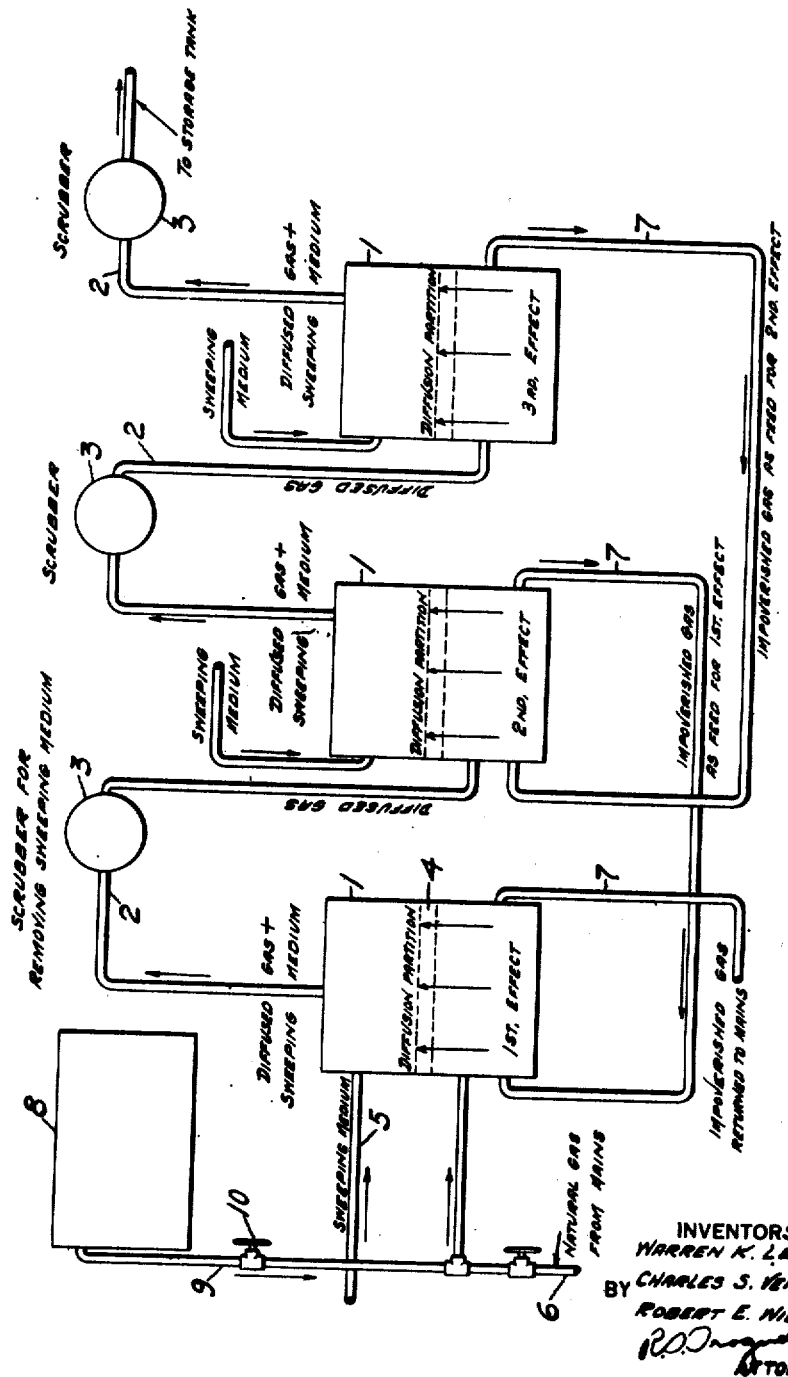
INVENTORS
WARREN K. LEWIS
CHARLES S. VENABLE
ROBERT E. WILSON
BY
ATTORNEY Patented June 3, 1924.

1,496,757

UNITED STATES PATENT OFFICE.

WARREN K. LEWIS, CHARLES S. VENABLE, AND ROBERT E. WILSON, OF CAMBRIDGE, MASSACHUSETTS, ASSIGNORS TO THE GOODYEAR TIRE & RUBBER COMPANY, OF AKRON, OHIO, A CORPORATION OF OHIO.

PROCESS OF SEPARATING GASES.

Application filed July 26, 1920. Serial No. 398,962.

*To all whom it may concern:*

Be it known that we, WARREN K. LEWIS, CHARLES S. VENABLE, and ROBERT E. WILSON, citizens of the United States, and residents of Cambridge, Massachusetts, have invented new and useful Improvements in Processes of Separating Gases, of which the following is a specification.

The object of our present invention is to provide a process of separating the ingredients of a mixture of gases into two or more fractions and to any degree of completeness desired.

The most common methods of separating a gas from a mixture of gases have heretofore been those in which is utilized the solubility or insolubility of all but one of the components of the mixture in some liquid, solution or solid, or the liquefaction or non-liquefaction (with subsequent rectification) under proper conditions of temperature and pressure, of all but one ingredient of the mixture, or the formation of some insoluble compound or some other definite chemical reaction. While these processes will frequently give a good separation of the gases, they require considerable time for their operation and are in general so expensive as to impose a very high price on the substances obtained and thereby render the method in many cases commercially impracticable.

We have now invented a process which is applicable to the separation of gaseous mixtures into their various constituents and one which is more rapid in action than the present methods in common use. Furthermore, as the process is continuous in action we are enabled to operate in such a manner as to obtain fractions of approximately constant composition produced or collected at an approximately constant rate.

The single figure of the accompanying drawing is a diagrammatic illustration of the arrangement of a series of chambers and cooperating equipment, adapted for the separation of gases, in accordance with our invention.

The principle upon which our process operates is that of repeated fractional diffusion. If a mixture of two gases, for example, helium and methane, is contained in a chamber connected by a capillary opening or orifice to another chamber containing a third gas, for example, steam, at the same total pressure, the gases will tend to pass from one chamber to the other, due to their constant molecular motion. Since the molecules of helium are lighter than those of methane, it can easily be proven that they must be moving with a higher velocity than those of the heavier gas, methane. This velocity can be shown to be inversely proportional to the square root of the molecular weights of the two gases, as has for some time been known.

It is obvious, therefore, that in the example given above, the lighter molecules of helium will strike the orifice connecting the two chambers relatively more frequently than those of the more slowly moving methane and therefore the gas which first passes thru the opening will be richer in the lighter constituent than was the original mixture. If the process is continued indefinitely, however, the concentration of helium in the chamber originally occupied by the steam will become so high that back diffusion will result and eventually the concentration of the three gases will be the same in each of the compartments. If, however, the mixture of helium and methane which first comes thru the opening is continuously removed in some way, and repeatedly subjected to the same process, it is obvious that the relative amounts of helium, as compared with methane, in the diffused gas will increase indefinitely.

If there is any appreciable difference in pressure between the two chambers, in addition to the phenomenon of diffusion described above, it is obvious that the gas as a whole will tend to pass from the chamber of higher pressure to the chamber of lower pressure. This motion of the gas as a whole through orifices, due to differences in pressure, will hereinafter be referred to as "mass motion", as contrasted with diffusion where the separation is due to a difference in the velocities of the gas molecules.

We have found that diffusion of the gases is practically independent of the pressure between the two chambers, but that the separation of the gases produced by diffusion can very readily be obscured or completely obliterated by the mass motion which results if the pressure difference between the two chambers is too large. It is obvious that if a good degree of separation is desired, the mass motion of the gas must be kept as low as possible. We have furthermore found that mass motion is decreased more rapidly than diffusion as the size of the orifices or capillaries between the chambers is decreased. It is therefore desirable to separate the two chambers by the use of "diffusion partitions", which shall have a large number of very fine holes, rather than a small number of large holes.

As indicated previously, the relative rates of diffusion of two gases will vary inversely as the square roots of their molecular weights. This statement is ordinarily referred to as Graham's law. A gas, such as helium, of molecular weight 4, would, then, diffuse twice as fast as the chief constituent of natural gas, methane, which has a molecular weight of 16.

In the process which we have developed for separating gases by fractional diffusion on a commercial scale, the original mixture of gases is passed into a chamber which is separated from a second chamber by a suitable porous partition. The gas which diffuses into this second chamber is enriched with respect to the constituent of lowest molecular weight and is not allowed to accumulate (which would cause back diffusion and thereby prevent any appreciable separation) but is swept along by a relatively large volume of some suitable sweeping agent, preferably by an inert gas which is later removed, after which the diffusion process is repeated. This separation is continued by a repetition of the successive steps in the manner indicated until a gas of the desired degree of purity is obtained.

In the accompanying drawing a series of chambers 1 are suitably connected together by means of conduits 2, also communicating with scrubbers 3. The conduits 2 are connected to conduct the gas from the chambers 1, which has passed through a diffusion partition 4, one of which is disposed in each of the chambers. Obviously the conduits are so connected as to conduct the diffused gas away from the first chamber to the proper side of the second chamber whereby it is again diffused and finally conducted to a storage tank, not shown. The first chamber 1 has conduits 5 and 6 connected thereto, which may also be suitably connected to a source of natural gas supply, and to a source of gas utilized as a sweeping medium, as indicated in the drawing. The conduit 5 is connected to a source of gas to be utilized as a sweeping medium and the conduit 6 is connected to a source of natural gas. A plurality of conduits 7 are connected to the various chambers 1 to return the impoverished gas to the next preceding chamber, and from the first chamber to the supply. Arrows are placed adjacent to the various conduits which indicate the direction of flow of gas therein.

If the system is utilized in conjunction with a liquefying process or refrigeration process of separating gases, the conduit 6 is adapted to be connected to a liquefying tank 8, provided with a conduit 9 having a suitable valve 10. There is no difference in the steps of the process when further diffusing gas that has been partially separated by means of a liquefying process, after the gas has been admitted to the conduit 6 that is connected to the source of supply, whatever it may be.

The diffusion partition may be made of such materials as blotting paper, wood pulp, felt, alundum, and filtros, or other similar highly porous material. We have obtained the best results with partitions of pulp, felt or extracted cross sections of wood. In order to achieve the most satisfactory results we have found that we should use a material which has a large number of very fine capillaries rather than a material of equal porosity which has a smaller number of larger holes.

We are aware that others have, on a very small scale, separated gases by diffusing them into a partially evacuated space, from which they were continually pumped out to prevent back diffusion. Operating under such conditions only an extremely dense and almost non-porous material, such as clay pipe stems, can be used, because otherwise, the gas will flow thru the partition by ordinary "mass motion" from the high pressure to the low pressure side of the diaphragm. There appears to be no evidence of anyone having separated gases by diffusion by the use of a diffusion partition having a capacity for more than one or two liters per square meter per twenty-four hours per atmosphere of hydrogen.

We have found, however, that by using a gas as a sweeping agent in the manner specified, and by permitting only a very small differential pressure to exist between the two chambers, it is possible to use very porous materials as diffusion partitions, and get extremely high transmission rates without any appreciable decrease in the efficiency of the separation.

While the absolute pressure of the system may be any necessary or desirable amount, we have found that the maximum allowable variation in pressure between the two sides of the diaphragm is approximately that equivalent to 0.04 in. of water if the diffusing gases are at atmospheric pressure. The permissible differential pressure increases directly in proportion to the total pressures used in the system as a whole. If this pressure is exceeded the gas passes thru these very porous diaphragms largely by means of mass flow, which so obscures diffusion that very little separation results.

The use of a very porous diffusion partition under conditions of accurate pressure control and in conjunction with a sweeping agent may be illustrated by the following example:—

A thin cross-section of spruce from which the resinous material has been removed was used as the diffusion partition. When a piece of this spruce 18 sq. cm. in area and 3 mm. in thickness was used, it was found that after 10 seconds, 22.4 c. c. of a hydrogen-nitrogen mixture diffused thru the partition. This was swept away by means of 400 c. c. of carbon dioxide. The initial gas passed over the surface of the diffusion partition contained 12% hydrogen and 88% nitrogen while the diffused gas contained 33.7% hydrogen and 66.3% nitrogen. The differential pressure on the carbon dioxide side of the partition was 0.01 in. of water lower than that of the other side. The enrichment corresponds to a diffusion rate for the hydrogen of 400,000 liters per square meter per twenty-four hours per atmosphere of hydrogen.

By increasing the differential pressure to one or two tenths inches of water on the diffusing gas side, a much lower degree of separation results. On the other hand, increasing the pressure on the sweeping gas side of the diffusion partition would be equivalent to a back pressure and would result in very little gas coming thru, altho the degree of separation secured would be greater. Three or four-tenths of an inch differential pressure in either direction would result in no appreciable separation whatever. This shows how essential is an accurate pressure control where a very porous material is used for separation by diffusion.

The effect of a slight back pressure on the efficiency of separation may be illustrated as follows:—

10 c. c. of a hydrogen-nitrogen mixture diffuse thru a 6.8 sq. cm. of a wood pulp partition 3 mm. thick in twenty seconds and was swept away with 1000 c. c. of carbon dioxide. The initial gas mixture passed over the surface of the diffusion partition contained 18.6% of hydrogen and 81.4% nitrogen, while the diffused gas contained 54.0% hydrogen and 46% nitrogen. The differential pressure on the carbon dioxide side of the partition was one-tenth inch of water greater than on the hydrogen-nitrogen side. This degree of separation is twenty per cent greater than would be expected from Graham's law and corresponds to a trasmission of 230,000 liters of hydrogen per square meter per twenty-four hours per atmosphere of hydrogen.

Altho we have mentioned carbon dioxide as a sweeping medium as a substitute for the maintenance of low pressure or vacuum to prevent the back diffusion of the gases thru the partition, we have found that other gases, such as dry steam, which is readily condensed, or ammonia which is easily removed by solution in water, may be used to place carbon dioxide in our process. In fact, any gas which can be readily separated from the diffused gas may be used for this purpose. A sweeping gas of fairly high molecular weight is desirable in order to minimize its own diffusion thru the diaphragm. Furthermore, we are able to utilize such media under different conditions of temperature and pressure as conditions of operation may require.

Other gaseous mixtures than those of hydrogen and nitrogen can be separated by our process. Thus, for example, if a sample of natural gas containing helium were subjected to 18 successive and identical steps according to our process as described, it would theoretically be possible to increase the helium content from 0.5% to 92%. Equally good results can be secured by treating water gas by this process whereby the hydrogen could be very readily separated from the other constituents. Most satisfactory results are obtained, and a minimum number of treatments are needed in those instances where there is the greatest difference possible in the molecular weights of the ingredients of the mixture.

It is also possible to combine our process of separating gases by diffusion with the so-called fractional refrigerating process in such a way as to materially increase the efficiency of both methods. In separating helium from the other gases in natural gas by the fractional refrigerating process, much difficulty is met in the last stages of the separation on account of the nitrogen present. This nitrogen could be very readily removed and a gaseous mixture of high helium content obtained, if the mixture resulting from the first stage of the refrigeration process be subjected to diffusion in the manner as hereinbefore described.

We are furthermore able to apply our diffusion process to the purification of balloon gases. When the lifting capacity of the gas has been impaired by the diffusion of air into the balloon which results in a decrease in the concentration of the helium or hydrogen or other gas there present, we are able to restore the gas to its original state of purity by subjecting the mixture to diffusion by the process as already described.

It will be apparent from the foregoing that the process above described as to its general feature, is applicable to a wide variety of problems involving the separation of gaseous mixtures. It will be understood that while we have described preferred methods of carrying our improved process as applied to certain specific materials, the invention is not to be regarded as limited to the methods described, except in so far as such limitations are included within the terms of the accompanying claims in which it is our intention to claim all novelty inherent in our invention as broadly as is permissible in view of the prior art.

What we claim is:

1. The process of separating gases which comprises diffusing the gases thru a diffusion partition, removing the diffused gas away from the partition by means of a sweeping material and removing the sweeping material from the diffused gas.

2. The process of separating gases which comprises diffusing the gases thru a diffusion partition, sweeping the diffused gas away from the partition by means of another gas, and removing the sweeping material from the diffused gas.

3. The process of separating gases which comprises diffusing the gases thru a diffusion partition, sweeping the diffused gas away from the partition by means of an inert gas and removing the sweeping material from the diffused gas.

4. The process of separating gases which comprises diffusing the gases under pressure thru a diffusion partition, sweeping the diffused gas away from the partition by means of an inert gas and removing the sweeping material from the diffused gas.

5. The process of separating gases which comprises diffusing the gases thru a diffusion partition, the opposite sides of which are maintained under a small differential pressure of not more than 0.04 in. of water.

6. The process of separating gases which comprises diffusing the gases thru a diffusion partition, sweeping the diffused gas away from the partition by means of another gas under a different pressure than the diffusing gas, and removing the sweeping material from the diffused gas.

7. The process of separating gases which comprises diffusing the gases thru a diffusion partition, sweeping the diffused gas away from the partition by means of an inert gas under a different pressure than the diffusing gas, and removing the inert gases from the diffused gas.

8. The process of separating gases which comprises diffusing the gases thru a diffusion partition, sweeping the diffused gas away from the partition by means of another gas under a higher pressure than the diffusing gas, and removing the sweeping material from the diffused gas.

9. The process of separating gases which comprises liquefying a gaseous mixture, allowing the more volatile gases to evaporate, and then separating the volatile gases into their constituents by diffusing the gases thru a diffusion partition, sweeping the diffused gas away from the partition by means of a sweeping agent and removing the sweeping agent from the diffused gas.

10. The process of separating gases which comprises liquefying natural gas, allowing the more volatile gases to evaporate, and then separating the helium from the volatile gases by diffusing the volatile gases through a diffusion partition, sweeping the diffused gas away from the partition by means of a sweeping agent and removing the sweeping agent from the diffused gas.

11. The process of separating gases which comprises diffusing the gases thru a membrane, removing the diffused gas away from the membrane by means of a sweeping material and removing the sweeping material from the diffused gas.

12. The process of separating gases which comprises diffusing the gases thru a diffusion partition, sweeping the diffused gas away from the partition by means of a fluid, and removing the fluid from the diffused gas.

In witness whereof, we have hereunto signed our names in the presence of two subscribing witnesses.

WARREN K. LEWIS.
CHAS. S. VENABLE.
ROBERT E. WILSON.

Witnesses:
L. M. HARTMAN,
ROBERT L. SIBLEY.